UNITED STATES PATENT OFFICE.

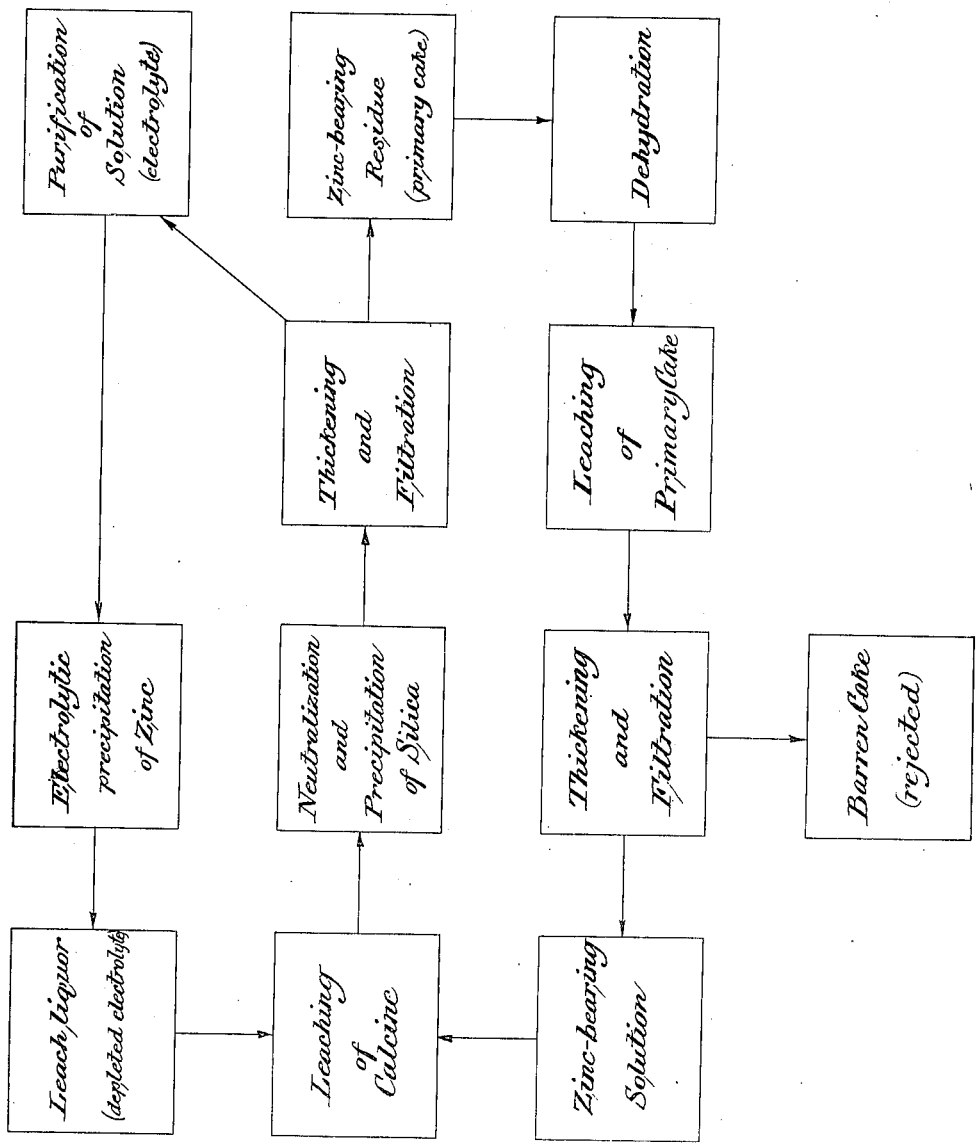

FREDERICK LAIST, OF ANACONDA, MONTANA, ASSIGNOR TO ANACONDA COPPER MINING COMPANY, OF ANACONDA, MONTANA, A CORPORATION OF MONTANA.

PROCESS OF RECOVERING ZINC.

1,281,031.   Specification of Letters Patent.   Patented Oct. 8, 1918.

Application filed January 29, 1918. Serial No. 214,310.

*To all whom it may concern:*

Be it known that I, FREDERICK LAIST, a citizen of the United States, residing at Anaconda, in the county of Deerlodge and State of Montana, have invented certain new and useful Improvements in Processes of Recovering Zinc, of which the following is a specification.

It is well known that in the hydrometallurgical treatment of silicious zinc ores the presence of gelatinous silica at certain stages of the process interferes seriously with the operation, not only by clogging the filters, but also by persistently retaining considerable volumes of rich zinc-bearing solution, and thereby reducing the recovery of zinc. The present invention is a process whereby these difficulties are largely overcome and materially increased yields of zinc are obtained. A preferred embodiment of the process is as follows:

Concentrates containing for example about 33 per cent. zinc, eight per cent. lead, 20 per cent. iron and six per cent. insoluble matter, the last comprising about 4.5 per cent. silica and 1.5 per cent. alumina, are roasted in multiple hearth furnaces in order to oxidize the sulfids to oxids and sulfates. The roasted product, or calcine, is then leached with a solution containing about eight to nine per cent. of sulfuric acid, this solution in a repetition of the process being the depleted electrolyte from the cells in which the zinc is electrolytically precipitated. Usually approximately five tons of leaching solution are used per ton of calcine. The resulting solution is then neutralized or nearly neutralized with calcine, and thereafter a small proportion of limestone is usually added. The effect of this limestone addition is to establish a slight alkaline condition in the liquor, and thereby to precipitate in gelatinous form any silica which has been dissolved during the acid treatment. Practically, it is necessary to effect complete precipitation of the silica at this point, since it will otherwise separate during later operating stages and occasion a great deal of trouble. The precipitation of silica may be rendered even more complete by adding to the pulp, after the limestone addition, a small amount of zinc dust; this reagent, either in presence or absence of copper salts, is very effective for precipitating any residual traces of dissolved silica. In presence of copper salts the cement copper is of course the active reagent.

The above-described operations of neutralizing the liquid and precipitating the silica are conveniently performed in Pachuca tanks with thorough stirring. At this point the soluton should carry at least 80 per cent. of the zinc content of the original calcine. The Pachuca tanks are now discharged into Dorr settling tanks or thickeners, and the thickened residue, together with the precipitated matters, passes to the filters. The filtrate, together with the overflow from the Dorr thickeners is a zinc solution usually containing small amounts of copper and cadmium. These metals are precipitated by zinc in dust or other suitable form, the solution clarified by settling or filtration and passed to the electrolytic cells. The entering electrolyte is a neutral solution containing about eight per cent. of zinc in the form of sulfate: the depleted electrolyte flowing from the electrolytic cells contains some two per cent. of zinc as sulfate, together with about eight to nine per cent. of sulfuric acid, and is returned to the leaching tanks as mentioned above. Lead anodes may be used, and the current conditions are preferably those which have become standard in this operation.

In the practice of the above process there is obtained a filter cake which comprises the insoluble matter from the ore and the precipitated gelatinous silica. This is in the form of a wet cake, usually containing 42-45 per cent. of moisture, which is of course in reality a rich zinc-sulfate solution. It is impossible to wash the cake free from zinc with an amount of water within practicable limits, and the losses at this point may attain 15 per cent. of the zinc content of the ore.

Efforts have been made to reduce this loss by removing the leach liquor from the residue before neutralizing and while still containing about 0.5 per cent. of acid. The acid pulp was passed through thickeners and filters, and yielded a dry, sandy cake, containing only about 20 per cent. of moisture and readily washed. However, the subsequent treatment of the acid solution with calcine, limestone and zinc dust yielded an unworkable precipitate of gelatinous silica, this precipitate being slimy, slow-settling, and producing a cake containing up to 80 per cent. of moisture. The necessity of precipitating the gelatinous silica in presence of the sandy ore residue was therefore established.

According to the present invention the mechanical difficulties due to the precipitation of gelatinous silica, as well as the excessive losses of zinc occasioned thereby, are avoided by proceeding substantially as follows:—

The silica is precipitated in presence of the ore-pulp, preferably in the manner first described above, that is, by successive additions of calcine, limestone, and zinc dust, if required, the latter either with or without copper salts. The subsequent operations of thickening and filtration are easily carried out in apparatus of standard type, but yield as above stated a filter cake of high moisture-content and rich in zinc.

This filter cake, which may be termed the "primary filter cake" and which need not be washed, is discharged from the press and dried or gently calcined at a temperature sufficiently high to effect dehydration of the silica, as well as of the hydroxids of alumina and iron, a temperature of about 150° C. being suitable. These compounds are thereby rendered insoluble in water or dilute acids, and are also converted into a granular condition which lends itself readily to filtration, the zinc values meantime remaining soluble. The dried residue is now leached with a sufficient quantity of acidified solution, so that, after the leaching is completed, a small excess of acid may remain. An 8% solution of sulfuric acid is suitable for this purpose. The pulp is now settled or thickened, filtered, and washed. The washing is readily accomplished in the filter, and the residue, termed the "secondary filter cake" is sandy or granular. The filtrate from the secondary filters, together with the overflow from the secondary settling tank, is acid, and is returned to the primary leaching tanks, being preferably introduced just before the final neutralization with calcine or limestone. By proceeding in this way losses of zinc, other than those due to insoluble zinc compounds in the calcine, may be substantially eliminated.

Reference is made to the accompanying drawing in which the figure is a flow-sheet diagrammatically illustrating a preferred embodiment of the complete process.

I claim:—

1. In a process of recovering zinc from silicious calcine, the steps which consist in leaching the calcine with an acid liquor, neutralizing the liquor and thereby precipitating silica in presence of the insoluble residue, separating the zinc-bearing solution from the residue, dehydrating the residue, and recovering zinc values therefrom by leaching.

2. In a process of recovering zinc from silicious calcine, the steps which consist in leaching the calcine with an acid liquor, neutralizing the liquor and thereby precipitating silica in presence of the insoluble residue, separating the zinc-bearing solution from the residue, dehydrating the residue, recovering zinc values therefrom by leaching with an acid solution and returning the resulting zinc-bearing solution to the primary leaching operation.

3. In a process of recovering zinc from silicious calcine, the steps which consist in precipitating dissolved silica in gelatinous form from a zinc-bearing solution, separating and dehydrating the precipitate, and recovering zinc from said dehydrated precipitate by leaching.

In testimony whereof I affix my signature.

FREDERICK LAIST.